United States Patent
Liou et al.

(10) Patent No.: US 10,855,931 B1
(45) Date of Patent: Dec. 1, 2020

(54) HIGH DYNAMIC RANGE IMAGE SENSING METHOD FOR IMAGE SENSING DEVICE

(71) Applicant: Novatek Microelectronics Corp., Hsinchu (TW)

(72) Inventors: Chi-Fan Liou, Taoyuan (TW); Wei Hsu, Taoyuan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/677,570

(22) Filed: Nov. 7, 2019

(51) Int. Cl.
*H04N 5/235* (2006.01)

(52) U.S. Cl.
CPC ......... *H04N 5/2355* (2013.01); *H04N 5/2351* (2013.01)

(58) Field of Classification Search
CPC .... H04N 5/2355; H04N 5/2351; H04N 5/351; H04N 5/355; H04N 5/35536; H04N 5/235; G06T 5/50
USPC ...................................................... 348/222.1
See application file for complete search history.

(56) References Cited

U.S. PATENT DOCUMENTS

| | | | | |
|---|---|---|---|---|
| 7,940,311 B2* | 5/2011 | Trimeche | ........... | H04N 9/04557 348/227.1 |
| 8,994,843 B2* | 3/2015 | Atanassov | ......... | H04N 5/35581 348/222.1 |
| 9,344,637 B2* | 5/2016 | Kasai | ................ | H01L 27/14609 |
| 9,794,529 B2* | 10/2017 | Lee | ........................ | H04N 9/045 |
| 10,110,827 B2* | 10/2018 | Mitsunaga | ......... | H04N 5/37457 |
| 10,728,473 B2* | 7/2020 | Zhao | .................... | H04N 5/2355 |
| 2009/0091645 A1* | 4/2009 | Trimeche | ......... | H04N 5/232933 348/273 |
| 2012/0050557 A1* | 3/2012 | Atanassov | ......... | H04N 5/35581 348/222.1 |
| 2012/0219235 A1* | 8/2012 | Solhusvik | ................. | G06T 5/50 382/275 |
| 2014/0267828 A1* | 9/2014 | Kasai | .................. | H04N 5/2355 348/229.1 |
| 2017/0013183 A1* | 1/2017 | Masuno | ............... | H04N 5/2356 |
| 2019/0281219 A1* | 9/2019 | Li | ........................ | H04N 5/35554 |
| 2019/0342511 A1* | 11/2019 | Zhao | .................. | H04N 5/23229 |
| 2020/0092459 A1* | 3/2020 | Bitan | .................... | H04N 5/2353 |

* cited by examiner

*Primary Examiner* — Pritham D Prabhakher
(74) *Attorney, Agent, or Firm* — JCIPRNET

(57) ABSTRACT

A high dynamic range image sensing method for an image sensing device is provided. The high dynamic range image sensing method comprises: calculating a brightness sum value of a pixel block to obtain a long exposure value; calculating a brightness average value of the pixel block to obtain a short exposure value; calculating a block average value of a plurality of adjacent pixel blocks; obtaining a weight value according to the block average value; and outputting a high dynamic range pixel value of one pixel according to the long exposure value, the short exposure value and the weight value.

6 Claims, 8 Drawing Sheets

|     |     |     |     |     |     |     |     |     |
| --- | --- | --- | --- | --- | --- | --- | --- | --- |
| P08 | P18 | P28 | P38 | P48 | P58 | P68 | P78 | P88 |
| P07 | P17 | P27 | P37 | P47 | P57 | P67 | P77 | P87 |
| P06 | P16 | P26 | P36 | P46 | P56 | P66 | P76 | P86 |
| P05 | P15 | P25 | P35 | P45 | P55 | P65 | P75 | P85 |
| P04 | P14 | P24 | P34 | P44 | P54 | P64 | P74 | P84 |
| P03 | P13 | P23 | P33 | P43 | P53 | P63 | P73 | P83 |
| P02 | P12 | P22 | P32 | P42 | P52 | P62 | P72 | P82 |
| P01 | P11 | P21 | P31 | P41 | P51 | P61 | P71 | P81 |
| P00 | P10 | P20 | P30 | P40 | P50 | P60 | P70 | P80 |

HIGH DYNAMIC RANGE IMAGE SENSING METHOD FOR IMAGE SENSING DEVICE

BACKGROUND OF THE INVENTION

Field of the Invention

The invention is related to an image sensing method, and more particularly, to a method generating an HDR image.

Description of Related Art

In the field of optical image sensing techniques, the high dynamic range imaging (HDR) technique is often used to process an original image to obtain an HDR image. In an HDR image, the issue of low recognition rate due to underexposure or overexposure is alleviated. The existing HDR technique combines dark areas in an image with higher exposure levels and bright areas in an image with lower exposure levels for at least two images of different exposure levels of the same scene to obtain more details of the bright areas and dark areas. That is to say, the current HDR technique has the limitation of having to provide a plurality of original images for synthesis.

SUMMARY OF THE INVENTION

The invention provides a high dynamic range image sensing method for brightness adjustment and generation of an HDR image for a single image.

The high dynamic range image sensing method of the invention comprises the following steps: calculating a brightness sum value of a pixel block to obtain a long exposure value; calculating a brightness average value of the pixel block to obtain a short exposure value; calculating a block average value of a plurality of adjacent pixel blocks; obtaining a weight value according to the block average value; and outputting a high dynamic range pixel value of one pixel according to the long exposure value, the short exposure value and the weight value.

Based on the above, in the invention, the long exposure value and the short exposure value are obtained according to the brightness value of the pixel block, and the weight value is obtained according to the block average value of the adjacent pixel blocks. The brightness value of each pixel block is adjusted to produce a high dynamic range pixel value according to the long exposure value, the short exposure value, and the weight value. In this way, in the invention, brightness adjustment may be performed on a single image to make the image adjustment more real-time.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4A shows a schematic of target pixel blocks of an embodiment of the invention located in a pixel block array central region.

FIG. 4B shows a schematic of target pixel blocks of an embodiment of the invention located in a pixel block array boundary region.

FIG. 4C shows a schematic of target pixel blocks of an embodiment of the invention located in a pixel block array corner region.

DESCRIPTION OF THE EMBODIMENTS

Figure 1:
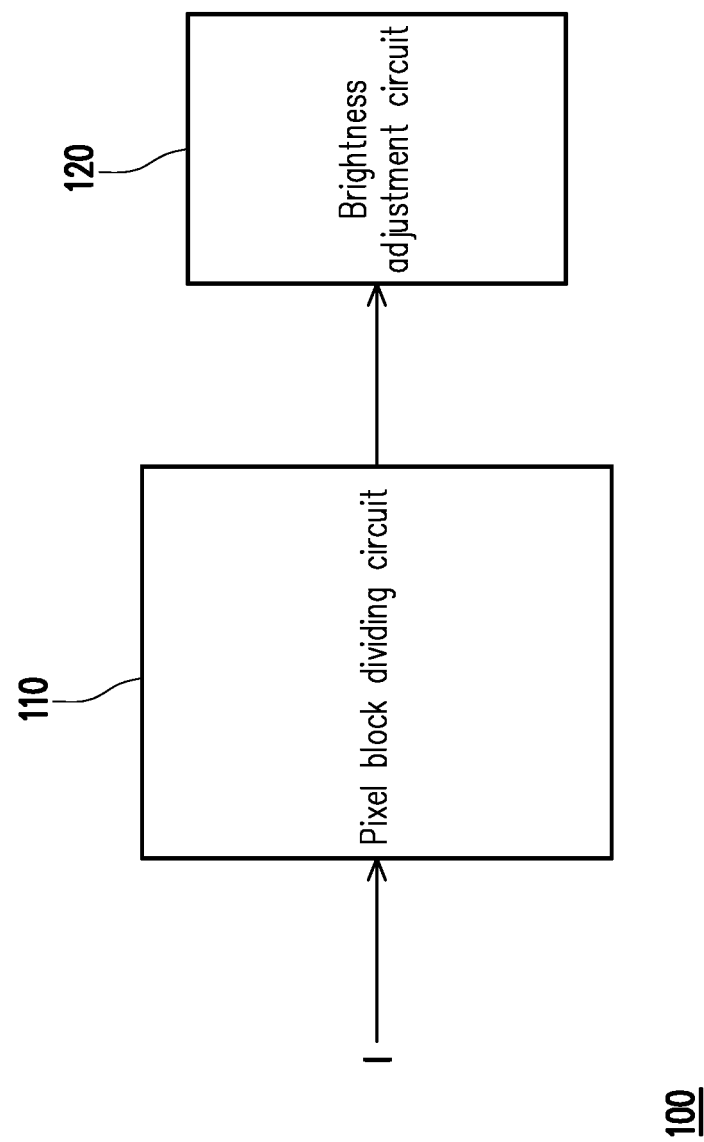
FIG. 1 shows a schematic of an image sensing device of an embodiment of the invention.

Referring to FIG. 1, FIG. 1 shows a schematic of an image sensing device of an embodiment of the invention. An image sensing device 100 includes a pixel block dividing circuit 110 and a brightness adjustment circuit 120. The pixel block dividing circuit 110 is configured to receive an image I, the image I includes a plurality of pixel blocks arranged in an array, and the pixel block dividing circuit 110 is configured to divide each of the pixel blocks into a plurality of divided pixel blocks.

Figure 2C:
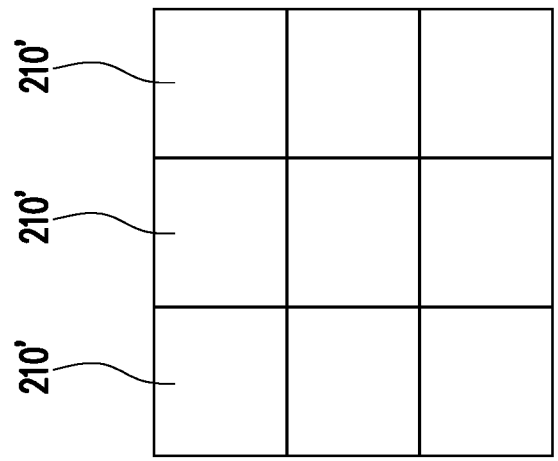
FIG. 2C shows a schematic of adjusted pixel blocks of the invention.
Figure 2B:
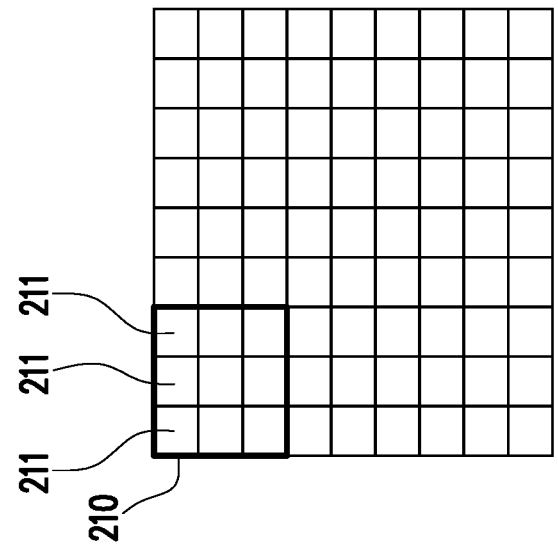
FIG. 2B shows a schematic of divided pixel blocks of the invention.
Figure 2A:
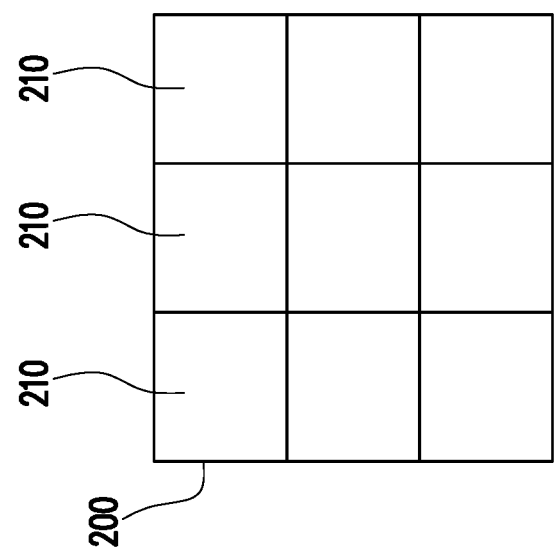
FIG. 2A shows a schematic of pixel blocks of the invention.

Referring to FIG. 2, FIG. 2A shows a schematic of pixel blocks of the invention, FIG. 2B shows a schematic of divided pixel blocks of the invention, and FIG. 2C shows a schematic of adjusted pixel blocks of the invention. an image includes N1*N2 pixel blocks, and the N1*N2 pixel blocks are arranged in an array. In particular, N1 and N2 are all positive integers greater than or equal to 2, and N1 may be greater than, less than, or equal to N2. For convenience of explanation, FIG. 2A to FIG. 2C only show 3*3 pixel blocks 210 or 210'.

Referring to FIG. 2A, an image 200 includes 3*3 pixel blocks 210. Referring to FIG. 1 and FIG. 2B simultaneously, the pixel block dividing circuit 100 receives the image 200 and divides each of the pixel blocks 210 of the image 200 into 3*3 divided pixel blocks 211. The brightness adjustment circuit 120 is coupled to the pixel block dividing circuit 110 and configured to detect R adjacent pixel blocks 210 directly adjacent to each of the pixel blocks 210, wherein R is equal to 2, 3 or 4. Moreover, the brightness adjustment circuit 120 adjusts the brightness value of each corresponding pixel block 210 to obtain adjusted pixel blocks 210' (see FIG. 2C) according to the brightness values of at least one of divided pixel blocks 211 of each of the pixel blocks 210 and the brightness values of at least one of divided pixel blocks 211 of the R adjacent pixel blocks directly adjacent to each of the pixel blocks 210. In other embodiments, each pixel block 210 of the image 200 can be divided into M1*M2 divided images 211, wherein M1, and M2 are all positive integers greater than or equal to 2, and M1 may be greater than, less than, or equal to M2.

Figure 3:
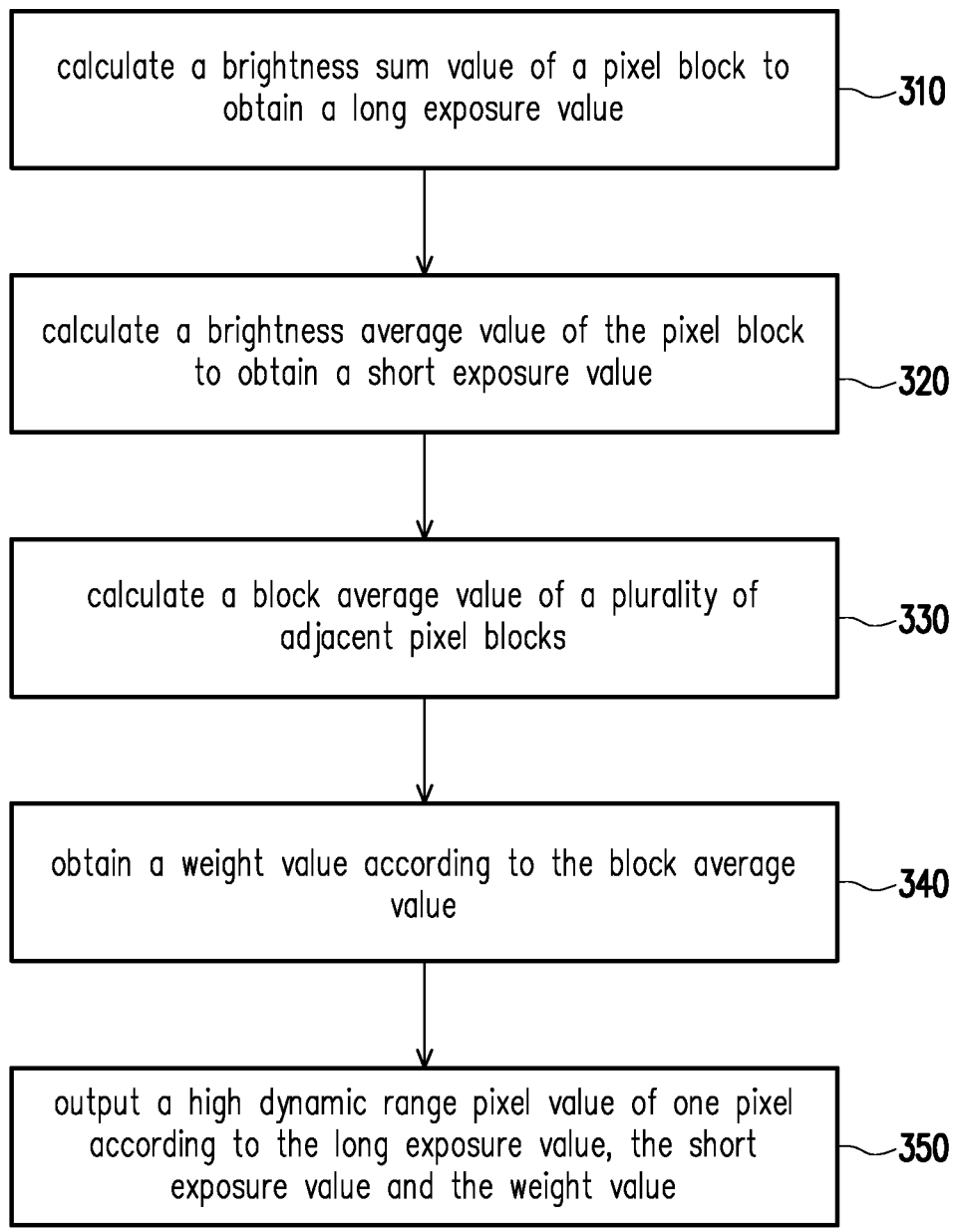
FIG. 3 shows a flowchart of an image sensing method of an embodiment of the invention.

FIG. 3 shows a flowchart of an image sensing method of an embodiment of the invention. Please refer to FIG. 3. In step 310, a brightness sum value of a pixel block is calculated to obtain a long exposure value. In step 320, a brightness average value of the pixel block is calculated to obtain a short exposure value. In step 330, a block average value of a plurality of adjacent pixel blocks is calculated. In step 340, a weight value according is obtained according to the block average value. In step 350, a high dynamic range pixel value of one pixel is outputted according to the long exposure value, the short exposure value and the weight value. The brightness adjustment circuit 120 repeats steps 310~350 to sequentially adjust the brightness of each of the pixel blocks 210 of the image 200.

Please refer to FIG. 1 and FIG. 3 at the same time. More specifically, an image is received by the pixel block dividing circuit 110, wherein the image includes a plurality of pixel blocks arranged in an array, and the pixel block dividing circuit 110 divides each of the pixel blocks into a plurality of divided pixel blocks. The brightness adjustment circuit 120 detects a plurality of adjacent pixel blocks directly adjacent to a target pixel block for a pixel block to be adjusted (hereinafter referred to as a target pixel block), and adjusts the brightness value of the target pixel block to obtain an adjusted target pixel block according to the brightness of at least one divided pixel block in the target pixel block and the brightness of at least one divided pixel block in each adjacent pixel block.

In an embodiment, the brightness adjustment circuit 120 calculates an average value of one divided pixel block in the pixel block and one divided pixel block in each adjacent pixel block as the brightness value of the pixel block for the pixel block to be adjusted. In an embodiment, the brightness adjustment circuit 120 calculates an average value of a plurality of divided pixel blocks in the pixel block and a plurality of divided pixel blocks in each adjacent pixel as the brightness value of the pixel block. In an embodiment, the brightness adjustment circuit 120 calculates an average value of all the divided pixel blocks in the pixel block and all the divided pixel blocks in each adjacent pixel block as the brightness value of the pixel block, and in an embodiment, the brightness value of the pixel block and the brightness value of the divided pixel block may be grayscale values. That is, in the invention, the brightness value of each pixel block may be adjusted by dividing each pixel block of the image into a plurality of divided pixel blocks according to the brightness value of at least one divided pixel block in each pixel block and the brightness value of at least one divided pixel block of each adjacent pixel block of each pixel block.

It should be noted that in the invention, the number of divided pixel blocks 311 in each pixel block 300 is not limited. In FIG. 2B, although each of the pixel blocks 300 is divided into 3*3 divided pixel blocks 211, in other embodiments, each of the pixel blocks 210 may also be divided into 2*2 divided pixel blocks 211 or 4*4 divided the pixel blocks 211, and may even be divided into 2*3 or 4*3 divided pixel blocks 211. In particular, the brightness of each pixel block division may be the same or different.

Figure 4A:
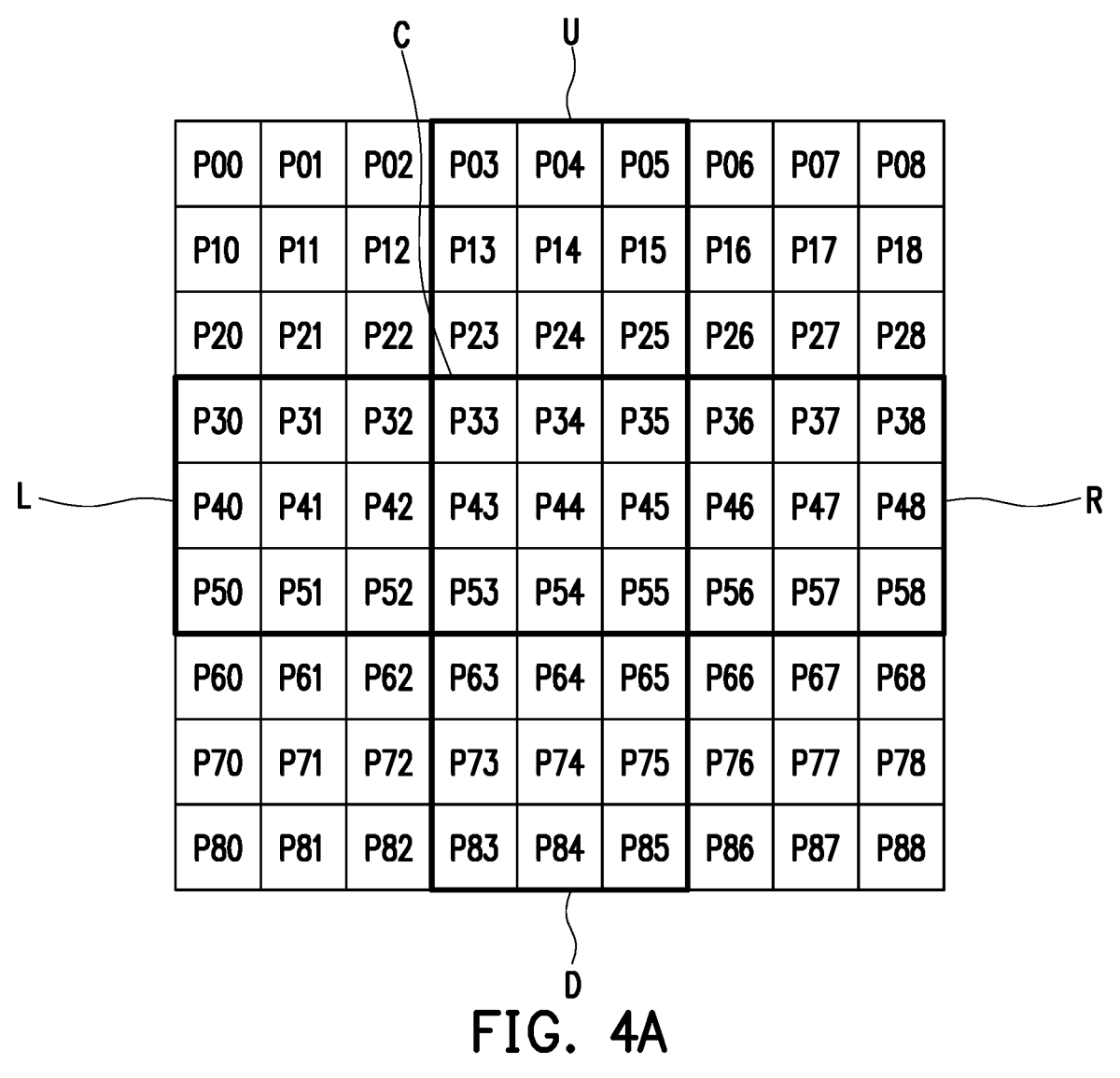

The brightness adjustment circuit 120 may also adjust the brightness of the pixel block in a more complicated manner. Details of the implementation of the brightness adjustment circuit 120 of an embodiment are described below with reference to FIG. 4. Referring to FIG. 4A, FIG. 4A shows a schematic of a target pixel block of an embodiment of the invention located in a pixel block array central region. In FIG. 4A, a pixel block C represents the pixel block to be adjusted (i.e., the target pixel block) by the brightness adjustment circuit 120, pixel blocks U, L, R, and D are a plurality of adjacent pixel blocks of the target pixel block C, and p00 to p88 represent divided pixel blocks. For convenience of explanation, p00 to p88 also represent the brightness values of the divided pixel blocks p00 to p88. The brightness adjustment circuit 120 detects the brightness values of all the divided pixel blocks in the target pixel block C and calculates the brightness sum value and brightness average value of all the divided pixel blocks in the target pixel block C. Specifically, the brightness sum value of all the divided pixel blocks in the target pixel block C are p33+p34+p35+p43+p44+p45+p53+p54+p55, and the brightness average value is (p33+p34+p35+p43+p44+p45+p53+p54+p55)/9. In an embodiment, the brightness values of the divided pixel blocks may be grayscale values. Moreover, the brightness adjustment circuit 120 takes the brightness sum value of all the divided pixel blocks in the target pixel block C as a long exposure value of the target pixel block C and takes the brightness average value of all the divided pixel blocks in the target pixel block C as a short exposure value of the target pixel block C.

However, in the invention, the basis for calculating the long exposure value and the short exposure value is not limited to the brightness values of all the divided pixel blocks in the target pixel block C. In an embodiment, the brightness adjustment circuit 120 may calculate the long exposure value and the short exposure value of the target pixel block C according to the brightness values of a plurality of (not all) divided pixel blocks in the target pixel block C.

The brightness adjustment circuit 120 may calculate a weight value of the target pixel block C according to the brightness value of at least one divided pixel block of the target pixel block C and the brightness value of at least one divided pixel block of the plurality of adjacent pixel blocks directly adjacent to the target pixel block C. Moreover, the brightness adjustment circuit 120 may adjust the long exposure value and the short exposure value of the target pixel block C according to the weight value of the target pixel block C and add the adjusted long exposure value and the adjusted short exposure value as the new brightness value of the target pixel block C.

Referring to FIG. 4A, as shown in FIG. 4A, when the target pixel block C is located in the central region of a plurality of pixel blocks arranged in an array in the image, the number of adjacent pixel blocks of the target pixel block C is 4. The brightness adjustment circuit 200 detects the brightness values of the plurality of divided pixel blocks of the four adjacent pixel blocks U, R, L, and D directly adjacent to the target pixel block C. The brightness adjustment circuit 200 further calculates the brightness sum value of the plurality of divided pixel blocks of the target pixel block C and the average value of the brightness sum values of the plurality of divided pixel blocks of each of the adjacent pixel blocks U, R, L, and D to obtain the regional brightness average value of the target pixel block C. In the present embodiment, the brightness adjustment circuit 200 may calculate the brightness values of all the divided pixel blocks in the target pixel block C and adjacent pixel blocks to obtain the regional brightness average value of the target pixel block C. That is to say, the regional brightness average of the target pixel block C is: [(p33+p34+p35+p43+p44+p45+p53+p54+p55)+(p03+p04+p05+p13+p14+p15+p23+p24+p25)+(30+31+32+40+41+42+50+51+52)+(p36+p37+p38+p46+p47+p48+p56+p57+p58)+(p63+p64+p65+p73+p74+p75+p83+p84+p85)]/5.

Figure 4B:
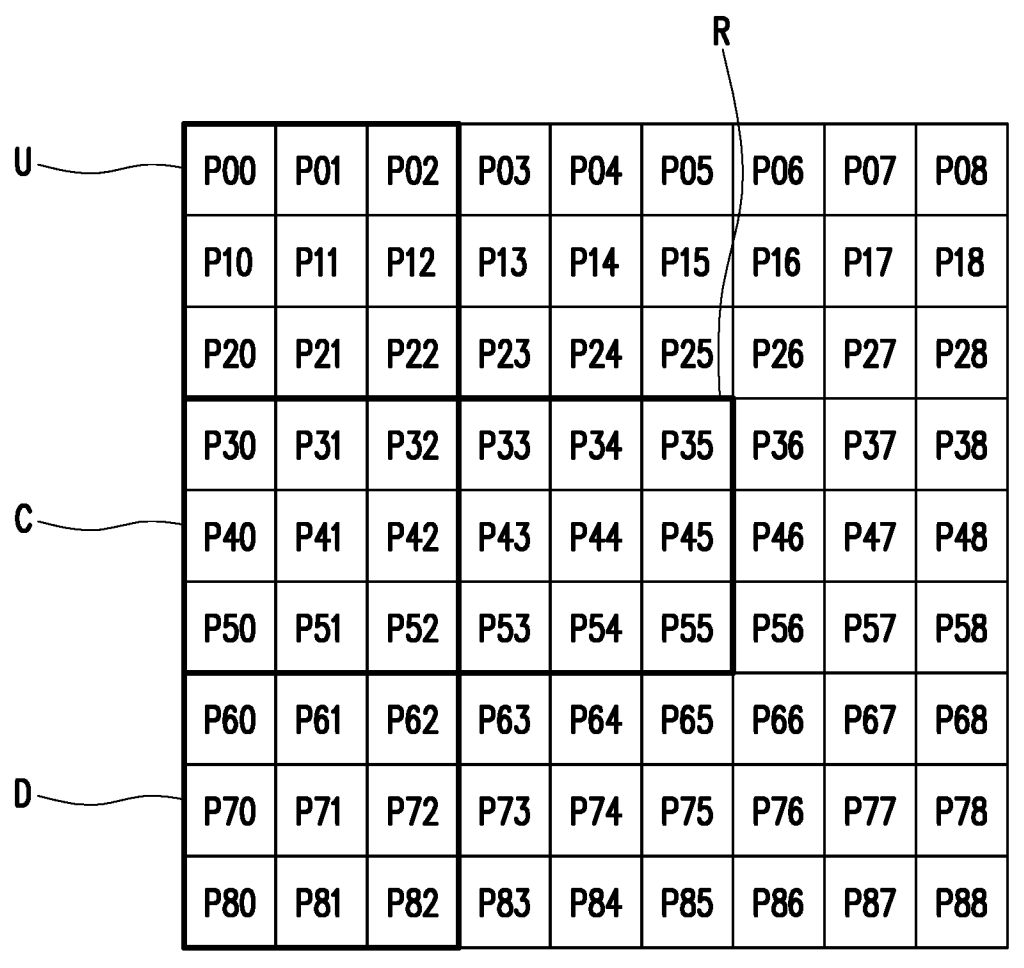

FIG. 4B shows a schematic of target pixel blocks of an embodiment of the invention located in a pixel block array boundary region. As shown in FIG. 4B, when the target pixel block C is located in the boundary region of a plurality of pixel blocks arranged in an array in the image, the number of adjacent pixel blocks of the target pixel block C is 3.

Since the target pixel block C is located in a boundary region of a plurality of pixel blocks arranged in an array in the image, the brightness adjustment circuit 120 detects only the brightness values of the plurality of divided pixel blocks of the boundary pixel blocks U, L, and D and accordingly calculates the regional brightness average value of the target pixel block C. In the present embodiment, the brightness adjustment circuit 120 may calculate the regional brightness average value of the target pixel block C according to the brightness values of all the divided pixel blocks in the target pixel block C and the adjacent pixel blocks U, L, and D. That is to say, the regional brightness average of the target pixel block C is: [(p30+p31+p32+p40+p41+p42+p50+p51+p52)+ (p00+p01+p02+p10+p11+p12+p20+p21+p22)+(p33+p34+ p35+p43+p44+p45+p53+p54+p55)+(p60+p61+p62+p70+ p71+p72+p80+p81+p82)]/4.

FIG. 4C shows a schematic of target pixel blocks of an embodiment of the invention located in a pixel block array corner region. As shown in FIG. 4C, when the target pixel block C is located in the corner region of a plurality of pixel blocks arranged in an array in the image, the number of adjacent pixel blocks of the target pixel block C is 2. Since the target pixel block C is located in a corner region of a plurality of pixel blocks arranged in an array in the image, the brightness adjustment circuit 200 detects only the brightness values of the plurality of divided pixel blocks of the boundary pixel blocks L and D and accordingly calculates the regional brightness average value of the target pixel block C. In the present embodiment, the brightness adjustment circuit 200 may calculate the regional brightness average value of the target pixel block C according to the brightness values of all the divided pixel blocks in the target pixel block C and the adjacent pixel blocks L and D. That is to say, the regional brightness average of the target pixel block C is: [(p00+p01+p02+p10+p11+p12+p20+p21+p22)+ (p03+p04+p05+p13+p14+p15+p23+p24+p25)+(p30+p31+ p32+p40+p41+p42+p50+p51+p52)]/3.

However, in the invention, the basis for calculating the regional brightness average value of the target pixel block C is not limited to the brightness values of all the divided pixel blocks in the target pixel block C. In an embodiment, the brightness adjustment circuit 200 may also calculate the regional brightness average value of the target pixel block C according to the brightness values of a plurality of (not all) divided pixel blocks in the target pixel block C and the plurality of adjacent target pixel blocks. In another embodiment, the brightness adjustment circuit 200 may calculate the regional brightness average value of the target pixel block C according to the brightness values of one divided pixel block in the target pixel block C and the plurality of adjacent target pixel blocks.

Figure 5:
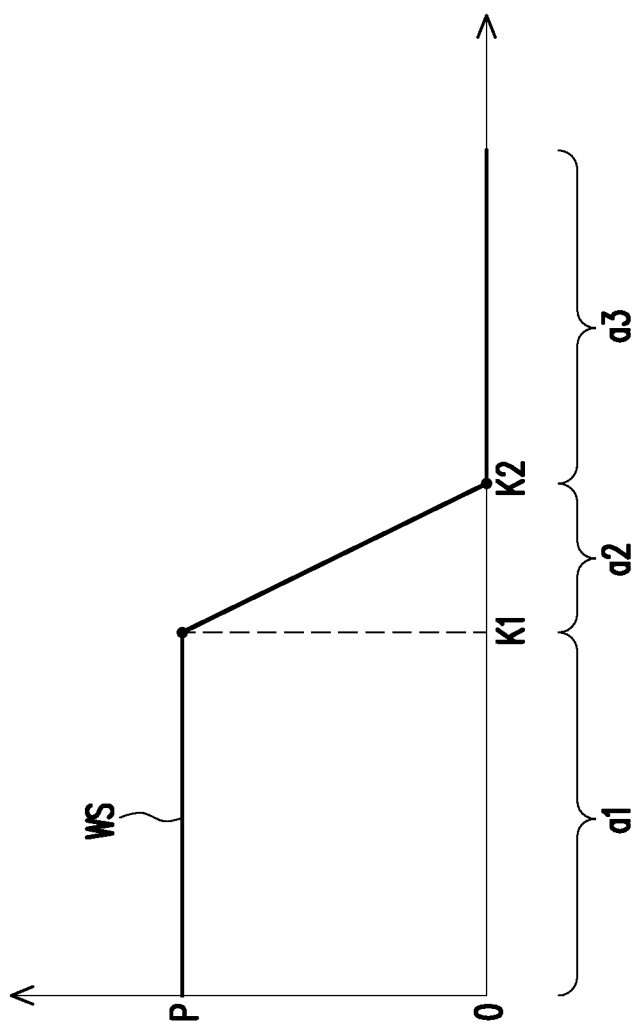
FIG. 5 shows the relationship between weight value and preset values of an embodiment of the invention.

The brightness adjustment circuit 200 may obtain the weight value of the target pixel block C by comparing the average value of the regional brightness average value of the target pixel block C with at least one preset value. Referring to FIG. 5, FIG. 5 shows the relationship between weight value and preset values of an embodiment of the invention. In FIG. 5, the horizontal axis represents the regional brightness average value, the vertical axis represents the weight value, and a weight curve WS represents the relationship between the weight value and the preset values. The first turning point of the weight curve WS corresponds to a first preset value K1 and the weight value P, the second turning point of the weight curve WS corresponds to a second preset value K2 and the weight value 0, and the horizontal axis is divided by the first preset value K1 and the second preset value K2 into three regional brightness average value ranges a1 to a3. The brightness adjustment circuit 200 compares the regional brightness average value of the target pixel block C, the first preset value K1, and the second preset value K2 to obtain the weight value from an integer of 0 to P. In particular, P is a positive integer, and the first preset value K1 and the second preset value K2 are parameter values preset by the system.

Specifically, when the regional brightness average value of the target pixel block C is less than both the first preset value K1 and the second preset value K2, the brightness adjustment circuit 200 sets the weight value to P. When the regional brightness average value of the target pixel block C is greater than both the first preset value K1 and the second preset value K2, the brightness adjustment circuit 200 sets the weight value to 0. When the regional brightness average value of the target pixel block C is between the first preset value K1 and the second preset value K2, the brightness adjustment circuit 200 sets the weight value according to the difference between the regional brightness average value and the second preset value K2.

In the present embodiment, the weight value P is 256. That is, when the regional brightness average value falls within the regional brightness average value range a1, the brightness adjustment circuit 200 obtains a weight value of 256. When the regional brightness average value falls within the regional brightness average value range a3, the brightness adjustment circuit 200 obtains a weight value of 0. When the regional brightness average value falls within the regional brightness average value range a2, the weight value obtained by the brightness adjustment circuit 200 is: 256* (second preset value−regional brightness average value)/ (second preset value−first preset value). In other embodiments, the range of the weight value P is 0 to 1 in floating point arithmetic. In this way, if the brightness values of the target pixel block C and the adjacent pixel blocks are higher, the brightness adjustment circuit 200 may obtain a lower (or even the lowest) weight value, so that the final adjusted pixel block adopts a higher ratio (even fully adopts) short exposure value. Conversely, if the brightness values of the target pixel block C and the adjacent pixel blocks are lower, the brightness adjustment circuit 200 may obtain a higher (or even the highest) weight value, so that the final adjusted pixel block adopts a higher ratio (even fully adopts) long exposure value.

In particular, the object of setting the first preset value K1 and the second preset value K2 is to generate one transitional weight value. The second preset value K2 may be greater than or equal to the first preset value K1. Comprehensively speaking, the greater the difference between the first preset value K1 and the second preset value K2, the better the gradient is at the light and dark junction of the adjusted image, and the smaller the difference between the first preset value K1 and the second preset value K2, the more obvious the light and dark junction of the adjusted image. In particular, the first preset value K1 and the second preset value K2 are not constant. In actual operation, the first preset value K1 and the second preset value K2 may be dynamically adjusted by the system according to the determined scene.

After obtaining the weight value of the target pixel block C, the brightness adjustment circuit 200 further generates a first brightness adjustment value and a second brightness adjustment value according to the weight value. Moreover, the brightness adjustment circuit 200 adjusts the long exposure value and the short exposure value via the first brightness adjustment value and the second brightness adjustment value, respectively. In the present embodiment, the first brightness adjustment value is the weight value, and the second brightness adjustment value is: (P−first brightness adjustment value)*(2^third preset value)/P. In particular, the third preset value is related to the number of divided pixel blocks in each pixel block. Specifically, 2^third preset value=number of divided pixel blocks in each pixel block. That is, when the number of divided pixel blocks in each pixel block is 4, the third preset value is set to 2. When the number of divided pixel blocks in each pixel block is 9, the third preset value is about 3.17. When the number of divided pixel blocks in each pixel block is 16, the third preset value is 4. Moreover, the brightness value of the adjusted pixel block is: long exposure value*first brightness adjustment value+short exposure value*second brightness adjustment value.

When the regional brightness average value of the target pixel block C falls within the regional brightness average value range a1 (indicating that the brightness is lower), the weight value is 256. At this time, the first brightness adjustment value is 256, and the second brightness adjustment value is 0, so that the brightness value of the adjusted target pixel block C is completely related to a high exposure value. When the regional brightness average value of the target pixel block C falls within the regional brightness average value range a3 (indicating that the brightness is higher), the weight value is 0. At this time, the first brightness adjustment value is 0, so that the brightness value of the adjusted target pixel block C is completely related to a low exposure value. When the regional brightness average value of the target pixel block C falls between the regional brightness average value range a1 and the regional brightness average value range a2, the brightness value of the adjusted target pixel block C is related to a high exposure value and a low exposure value.

Figure 6:
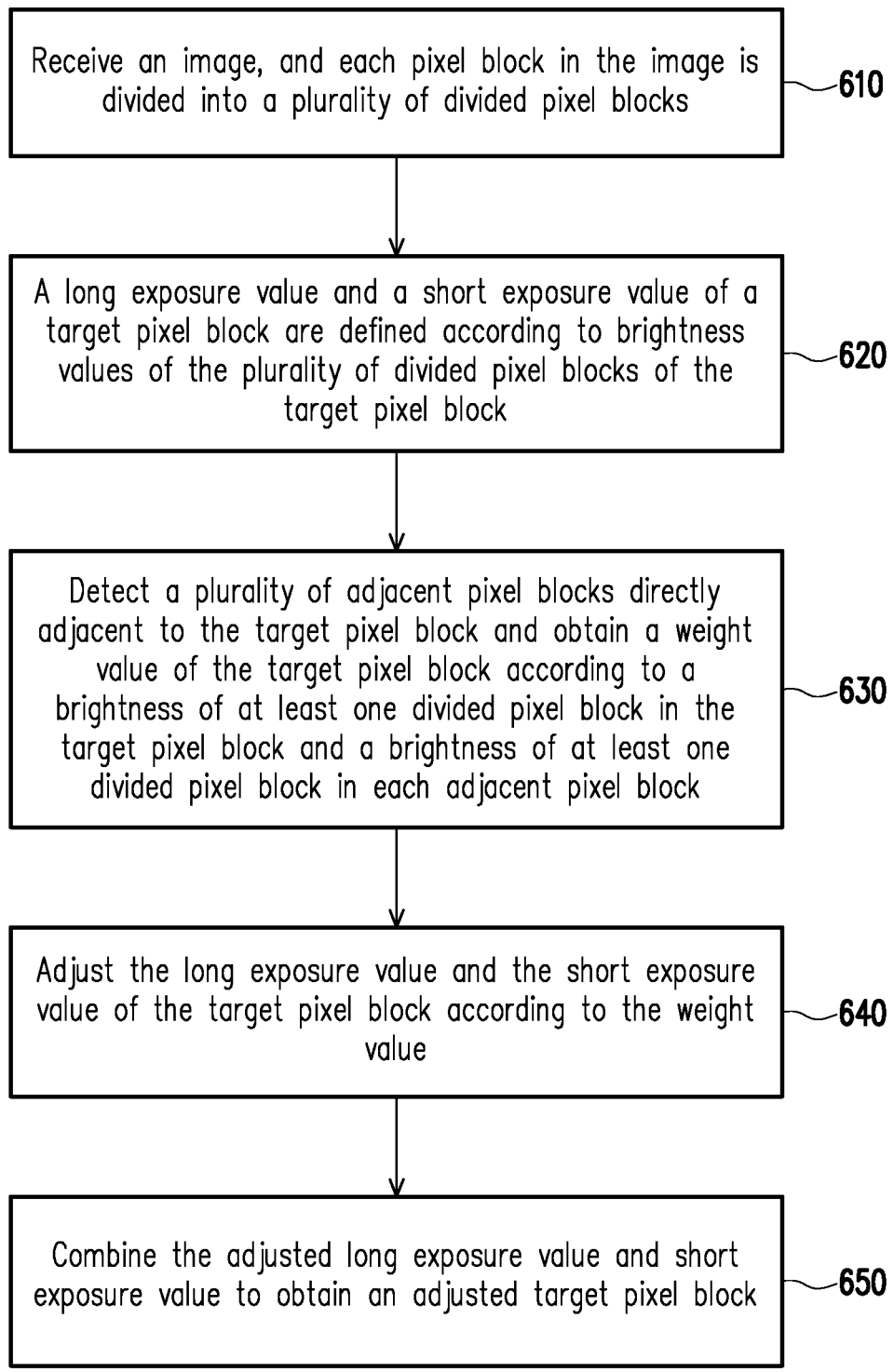
FIG. 6 shows a flowchart of an image sensing method of an embodiment of the invention.

Referring to FIG. 6, FIG. 6 shows a flow chart of an image sensing method of an embodiment of the invention. In step 610, the pixel block dividing circuit 110 receives an image, and each pixel block in the image is divided into a plurality of divided pixel blocks. In step 620, a long exposure value and a short exposure value of a target pixel block are defined by the brightness adjustment circuit 120 according to brightness values of the plurality of divided pixel blocks of the target pixel block. In step 630, the brightness adjustment circuit 120 detects a plurality of adjacent pixel blocks directly adjacent to the target pixel block and obtains a weight value of the target pixel block according to a brightness of at least one divided pixel block in the target pixel block and a brightness of at least one divided pixel block in each adjacent pixel block. In step 640, the brightness adjustment circuit 120 adjusts the long exposure value and the short exposure value of the target pixel block according to the weight value. In step 650, the brightness adjustment circuit 120 combines the adjusted long exposure value and short exposure value to obtain an adjusted target pixel block. In an embodiment, the brightness values of the divided pixel blocks and the brightness value of the adjusted target pixel block may be grayscale values.

In particular, the step of obtaining the weight value of the target pixel block (i.e., step 630) may be further subdivided into a step of calculating a target pixel block regional brightness average value, a step of comparing the regional brightness average value, the first preset value, and the second preset value, and a step of determining the weight value of the target pixel block according to the comparison result. The step of adjusting the long exposure value and the short exposure value of the target pixel block via the weight value (i.e., step 640) may be further subdivided into a step of generating a first brightness adjustment value and a second brightness adjustment value according to the weight value, a step of adjusting the long exposure value according to the first brightness adjustment value, and a step of adjusting the short exposure value according to the second brightness adjustment value. Details of the implementation of the foregoing detailed steps have been described above, and thus are not repeated herein. In the present embodiment, the brightness adjustment circuit 120 may adjust the brightness value of each pixel block by taking each pixel block as the target pixel block, thereby obtaining an adjusted image.

In particular, the pixel block dividing circuit 110 may include a CMOS imaging sensor. The brightness adjustment circuit 120 may be a processor with computing power. Alternatively, the brightness adjustment circuit 120 may be designed by a hardware description language (HDL) or any other design methods of a digital circuit known to those having ordinary skill in the art, and is a hardware circuit implemented by a field programmable gate array (FPGA), complex programmable logic device (CPLD), or application-specific integrated circuit (ASIC).

Based on the above, in an embodiment of the invention, the brightness of the target pixel block C may be adjusted by dividing the image into divided pixel blocks thinner than the pixel block size according to the brightness value of at least one divided pixel block in the target pixel block C and the brightness value of at least one divided pixel block in each adjacent pixel block. In the invention, the above processing may be performed on each pixel block of the image in order for a single image to obtain an HDR image.

In another embodiment of the invention, the brightness sum value and the brightness average value of a plurality of divided pixel blocks in the target pixel block C are respectively used as the long exposure value and the short exposure value of the target pixel block C, and the long exposure value and the short exposure value are adjusted via the weight value to adjust the brightness value of the target pixel block C. In the invention, the above processing may be performed on each pixel block in order to obtain an HDR image.

It should be mentioned that, since the image is oversampled first, in the invention, the long exposure value and the short exposure value of the target pixel block C may be determined via the brightness value of one or a plurality of divided pixel blocks of the target pixel block C. Therefore, in the invention, only a single image is needed to obtain an adjusted HDR image.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A high dynamic range image sensing method for an image sensing device, comprising:
   calculating a brightness sum value of a pixel block to obtain a long exposure value;
   calculating a brightness average value of the pixel block to obtain a short exposure value;
   calculating a block average value of a plurality of adjacent pixel blocks;
   obtaining a weight value according to the block average value; and
   outputting a high dynamic range pixel value of one pixel according to the long exposure value, the short exposure value and the weight value;

calculating a brightness average value of a plurality of divided pixel blocks in the pixel block to obtain the short exposure value of the pixel block;

calculating a brightness sum value of the plurality of divided pixel blocks in the pixel block to obtain a long exposure value of the pixel blocks;

detecting a plurality of adjacent pixel blocks directly adjacent to the pixel block;

obtaining the weight value according to a brightness value of the at least one divided pixel block in the pixel block and a brightness value of the at least one divided pixel block in each of the adjacent pixel blocks;

adjusting the long exposure value of the pixel block and the short exposure value of the pixel block according to the weight values;

combining the adjusted long exposure value and the adjusted short exposure value to obtain adjusted pixel blocks.

2. The image sensing method of claim 1, further comprising:

averaging the brightness sum value of the plurality of divided pixel blocks in the pixel block and a brightness sum value of the plurality of divided pixel blocks in the adjacent pixel blocks of the pixel block to obtain a regional brightness average value of the pixel block;

comparing the regional brightness average value of the pixel block, a first preset value, and a second preset value to obtain the weight value of the pixel block and generating a first brightness adjustment value and a second brightness adjustment according to the weight value; and adjusting the long exposure value according to the first brightness adjustment value and adjusting the short exposure value according to the second brightness adjustment value.

3. The image sensing method of claim 2, wherein the regional brightness average value of the pixel block, the first preset value, and the second preset value are compared to obtain the weight value from an integer of 0 to P, wherein P is a positive integer.

4. The image sensing method of claim 3, wherein:

the weight value is P when the regional brightness average value is less than the first preset value and the regional brightness average value is less than the second preset value;

the weight value is 0 when the regional brightness average value is greater than the first preset value and the regional brightness average value is greater than the second preset value; and the weight value is: P*(the second preset value−the regional brightness average value)/(the second preset value−the first preset value) when the regional brightness average value is greater than the first preset value and the regional brightness average value is less than the second preset value.

5. The image sensing method of claim 3, wherein the second brightness adjustment value is: (P−the first brightness adjustment value)*(2^a third preset value)/P.

6. The image sensing method of claim 1, wherein a number of the adjacent pixel blocks of the pixel block is 4 when the pixel block is located in a central region of the image, the number of the adjacent pixel blocks of the pixel block is 3 when the pixel block is located in a boundary region of the image, and the number of the adjacent pixel blocks of the pixel block is 2 when the pixel block is located in a corner region of the image.

* * * * *